US009596655B2

(12) United States Patent
Leicht et al.

(10) Patent No.: US 9,596,655 B2
(45) Date of Patent: Mar. 14, 2017

(54) RADIO RESOURCE CONTROL TECHNIQUE

(75) Inventors: Hans Juergen Leicht, Unterleinleiter (DE); Gerhard Hierl, Nuremberg (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/408,764

(22) PCT Filed: Jun. 20, 2012

(86) PCT No.: PCT/EP2012/002599
§ 371 (c)(1),
(2), (4) Date: Nov. 23, 2015

(87) PCT Pub. No.: WO2013/189508
PCT Pub. Date: Dec. 27, 2013

(65) Prior Publication Data
US 2016/0157181 A1 Jun. 2, 2016

(51) Int. Cl.
*H04W 52/02* (2009.01)
(52) U.S. Cl.
CPC ... *H04W 52/0267* (2013.01); *H04W 52/0251* (2013.01)
(58) Field of Classification Search
CPC ... H04B 1/16; H04B 1/1607; H04W 22/0216; H04W 52/0257; H04W 52/0229; H04W 88/02; H04W 22/0267; H04W 52/0251; H04M 3/2209; H05B 33/08; H05B 33/0245
See application file for complete search history.

(56) References Cited

U.S. PATENT DOCUMENTS

2008/0075026 A1* 3/2008 Son ............... H04W 52/0216
370/311
2009/0239592 A1* 9/2009 Deng .................. H04B 1/16
455/574

(Continued)

FOREIGN PATENT DOCUMENTS

EP 1903815 A2 3/2008

OTHER PUBLICATIONS

LTE, "3rd Generation Partnership Project; Technical Specification Group Radio Access Network; Evolved Universal Terrestrial Radio Access (E-UTRA); Medium Access Control (MAC) protocol specification (3GPP TS 36.321 version10.5.0, Release 10)" Mar. 2012, 54 pages.

(Continued)

*Primary Examiner* — Thanh Le
(74) *Attorney, Agent, or Firm* — Rothwell, Figg, Ernst & Manbeck, P.C.

(57) ABSTRACT

A technique for controlling a duty cycle of a transmitter in a mobile device is provided. When the mobile device is wirelessly connected to a telecommunications network, discontinuous reception and transmission is provided by a duty cycle including an active state and an inactive state. As to a method aspect of the technique, a switching option for initiating the inactive state after the active state is determined. It is assessed whether a timer of the mobile device triggers a future transmission at a corresponding transmission time. If a time difference between the switching option and the transmission timer exceed a predefined minimum duration, the inactive state is initiated.

14 Claims, 7 Drawing Sheets

(56) References Cited

U.S. PATENT DOCUMENTS

2014/0093019 A1* 4/2014 Oehler ................... H04B 1/16
                                                              375/343
2015/0294077 A1* 10/2015 Jani ..................... H04B 17/21
                                                              455/343.1

OTHER PUBLICATIONS

LTE, "3rd Generation Partnership Project; Technical Specification Group Radio Access Network; Evolved Universal Terrestrial Radio Access (E-UTRA); Radio Link Control (RLC) protocol specification" (3GPP TS 36.322 version 11.0.0, Release 11) Dec. 2009, 39 pages.

* cited by examiner

RADIO RESOURCE CONTROL TECHNIQUE

CROSS REFERENCE TO RELATED APPLICATION(S)

This application is a 35 U.S.C. §371 National Phase Entry Application from PCT/EP2012/002599, filed Jun. 20, 2012, the disclosure of which is incorporated herein by reference.

TECHNICAL FIELD

The present disclosure relates to a controlled power saving technique. In particular, and without limitation, the disclosure relates to a technique for controlling a duty cycle of a transceiver of a mobile device in a connected state.

BACKGROUND

In wireless telecommunication, a User Equipment (UE) has to supply significant power to its radio frequency transceiver, fast analogue-to-digital-converters, wideband signal processing units, etc. While data rates of Long Term Evolution (LTE) systems exceed those of the Universal Mobile Telecommunications System (UMTS) by a factor of up to fifty, wireless device batteries still provide approximately the same capacity, so substantial improvements in power usage are necessary to operate at such high data rates and wide bandwidths. LTE power safe protocols include Discontinuous Reception (DRX) and Discontinuous Transmission (DTX), as defined in 3GPP TS 36.321. The protocols of both UMTS and LTE provide a set of functionalities allowing the UE to perform micro sleep events also in a Radio Resource Control (RRC) connected mode. For example, LTE allows an implementation to not constantly monitor the Physical Downlink Control Channel (PDCCH) every Transmission Time Interval (TTI). A DRX-DTX cycle (also referred to as a DRX cycle or duty cycle) includes an active state followed by an inactive period, which allows the UE to safe battery resources by turning off its transceiver for a certain time period in a DRX Sleep Mode.

In a connection configured for DRX between the UE and a base station, the UE and the base station have a common understanding of the DRX cycles as to a mandatory active time, cycle duration, and synchronization. Beyond the mandatory active time, the active state is maintained by the UE as long as data transfer is ongoing, leaving less time available for the DRX Sleep Mode.

Conventional implementations of the LIE power safe protocol aim at entering the DRX Sleep Mode of the UE as fast and as often as possible to maximize savings of power consumption. However, switching between the active state and the DRX Sleep Mode requires some time for controlled enabling and disabling of involved hardware units, system clocks, etc. For example, when uplink data for transmission arrives just after a transition to the DRX Sleep Mode, it takes time to bring the involved hardware units back to the active state, which results in a delayed transmission of the uplink data.

SUMMARY

Accordingly, there is a need for a technique for controlling a transmitter that harnesses power savings by discontinuous operation without delaying, in at least some situations, data transmission.

According to one aspect, a method of controlling a duty cycle of a transmitter of a mobile device wirelessly connected to a telecommunications network is provided. The duty cycle includes an active state and an inactive state. The method comprises the steps of determining a switching option for initiating the inactive state after the active state; assessing whether at least one timer of the mobile device triggers a future transmission at a transmission time; and initiating the inactive state, if a time difference between the switching option and the transmission time exceeds a predefined minimum duration.

At least in some embodiments, the inactive state is thus not initiated, if a delay of the future transmission is foreseeable at the mobile device by means of the at least one timer of the mobile device. By virtue of the predefined minimum duration, frequently switching between the inactive state and the active state can be prevented. A delay of the future transmission due to time required for switching to the inactive state and returning to the active state can be avoided. In same or some other embodiments, no adaptation may be required at the side of the telecommunications network.

The mobile device may be in a connected state with the telecommunications network throughout the duty cycle. The method may be triggered by the switching option or may be performed synchronous with the duty cycle. The inactive state may be initiated at or after the switching option.

The method may further comprise the step of returning to the active state on or before the transmission time. The method may further comprise the step of performing the transmission at the transmission time.

The method may further comprise the step of extending or maintaining the active state, if the time difference between the switching option and the transmission time does not exceed the predefined minimum duration. The active state may be extended or maintained, if the timer expires prior to the predefined minimum duration after the switching option.

The switching option may be a potential beginning of the inactive state for a given duty cycle. The switching option may be a point in time within the duty cycle. The transmission time may be a point in time within the same duty cycle or a subsequent duty cycle. The active state may be mandatory at a beginning of the duty cycle. The switching option may be an end point of the mandatory active state. A standard implemented by the mobile device and/or the telecommunications network may stipulate a mandatory duration of the active state. Initiating the inactive state outside the mandatory duration of the active state may be decided upon by the mobile device. The decision may be at the sole discretion of the mobile device. At least one of the duty cycle and the switching option may be determined by the telecommunications network or may be synchronized with the telecommunications network. The duty cycle may correspond to a Discontinuous Transmission (DTX) and/or a Discontinuous Reception (DRX) of the mobile device. Active states and inactive states of DRX and DTX may be synchronized.

The decision whether to initiate the inactive state (e.g., at the switching option) or to extend the active state (e.g., beyond the switching option) may be made on or before the switching option. In case the decision whether to initiate the inactive state is decided outside the mandatory duration of the active state (e.g., if the inactive state could be initiated immediately), the switching option may correspond to a current point in time (e.g., a time of the decision). The time difference may be a period of time remaining until the transmission time.

The transmitter may be comprised in a transceiver unit of the mobile device. The transceiver unit may further comprise a receiver. Initiating the inactive state may include disabling at least one of the transmitter, the receiver and the transceiver unit, e.g., so as not to consume any additional current. Initiating the inactive state may further include a shutdown process of digital logic components that are not used in the inactive state. Alternatively or in addition, initiating the inactive state may include that the mobile device initiates a shutdown process of all non-essential clocks. The non-essential clocks may include clocks of the transceiver unit or non-essential clocks supplying the transceiver unit. Returning to the active state may include enabling at least one of the transmitter, the receiver and the transceiver unit. Returning to the active state may further include a startup process of the digital logic components and/or the clocks.

The predefined minimum duration may be determined by one or more processes involved in at least one of initiating the inactive state and returning to the active state. The processes may include the shutdown process and the startup process.

The predefined minimum duration may be tabulated in the mobile device. The predefined minimum duration may be based on time measurements of the one or more processes. The measurements may be performed prior to or during manufacture of mobile device, the transceiver unit, or any other component performing the one or more processes.

Initiating the inactive state may further be subject to the condition that no transmission is ongoing. The method may further comprise the step of determining whether data for uplink transmission is pending. Initiating the inactive state may further be subject to the condition that no uplink data is pending. The active state may be extended as long as there is an ongoing transmission and/or uplink data is pending. The switching option may be the end point of the extended active state.

The uplink data may be user data. The user data may relate to a File Transfer Protocol (FTP) session, a Hypertext Transfer Protocol (HTTP) session, an Internet Message Access Protocol (IMAP) session, a Simple Mail Transfer Protocol (SMTP) session, or any other application session.

The future transmission required according to the at least one timer may relate to a transmission of control data and/or a retransmission of previously transmitted user data. The future transmission may transmit control data. Alternatively or in addition, the future transmission may transmit delay-tolerant and error-sensitive user data. The future transmission may transmit Acknowledged Mode Data (AMD). The AMD may relate to non-real-time applications, e.g., web browsing or electronic mail. The AMD may include the control data, e.g., in a header.

The transmitter or the transceiver unit may provide functionality of a Data Link Layer, e.g., above a Physical Layer according to the Open Systems Interconnection (OSI) model. The Data Link Layer may include a Packet Data Convergence Protocol (PDCP) sublayer, a Radio Link Control (RLC) sublayer, and a Medium Access Control (MAC) sublayer. The RLC sublayer may be configured to reformat a Protocol Data Unit (PDU) of the PDCP sublayer by means of segmentation and/or concatenation to fit a size required by the MAC sublayer, e.g., the size of a Transport Block (TB).

One or more of the at least one timer may be initialized and/or started in response to a loss of a data unit. Alternatively or in addition, the same or another timer of the at least one timer may exclude or prohibit an outstanding transmission. In general, the transmission time may be indicated by an expiry of the corresponding timer.

The future transmission may be generated, triggered or determined by the Data Link Layer, the RLC sublayer, and/or the MAC layer of the mobile device. One or all of the at least one timer may be a timer of the RLC sublayer of the mobile device.

The at least one timer may include at least one of a retransmission timer, a reorder timer, and a status-prohibition timer. A status may relate to a particular PDU. The status may be provided by a receiver of the PDU to a sender of the PDU. The mobile device, e.g., the RLC sublayer thereof, may take the role of the receiver, the sender or both. The status may indicate success or failure of a reception of the AMD. The status may include an acknowledge signal, a negative-acknowledge signal, or the status may be absent (e.g., not received).

The AMD may be transmitted by means of the PDU. The AMD PDU may include a poll bit as the control data. The poll bit may indicate a request for a status response (e.g., a status to be received by the mobile device). Alternatively or in addition, the control data may include a request for retransmitting an AMD PDU. In a further alternative or in addition, the control data may include the status.

According to another aspect, a computer program product is provided. The computer program product comprises program code portions for performing one or more of the steps of the method aspect described herein when the computer program product is executed on one or more computing devices. The computer program product may be stored on a computer-readable recording medium such as a permanent or re-writeable memory. The computer program product may also be provided for download via one or more computer networks, such as the Internet, the cellular telecommunications network or a wireless or wired Local Area Network (LAN).

As for a hardware aspect, an apparatus for controlling a duty cycle of a transmitter of a mobile device adapted to be wirelessly connected to a telecommunications network is provided. The duty cycle includes an active state and an inactive state. The apparatus comprises a determining unit adapted to determine a switching option for initiating the inactive state after the active state; an assessing unit adapted to assess whether at least one timer of the mobile device triggers a future transmission at a transmission time; and an initiating unit adapted to initiate the inactive state, if a time difference between the switching option and the transmission time exceeds a predefined minimum duration.

BRIEF DESCRIPTION OF THE DRAWINGS

In the following, further details and advantageous of the disclosure will be described with reference to exemplary embodiments illustrated in the drawings, wherein FIG. 1 schematically illustrates a telecommunications network including a mobile device in a connected state.

DETAILED DESCRIPTION

In the following, for purposes of explanation and not limitation, specific details are set forth, such as particular sequences of steps, components and configurations, in order to provide a thorough understanding of the present disclosure. It will be apparent to one skilled in the art that the disclosure may be practiced in other embodiments that depart from these specific details. For example, while the embodiments are described with reference to a mobile telecommunications network, base stations and mobile devices, which are working according to the 3GPP LTE standard, it is apparent to the skilled person that the disclosure can also be practiced in context of mobile communication networks and components, which are working in accordance with other mobile communication standards. Furthermore, while the disclosure is primarily described in the context of a Data Link Layer, the disclosure may also be implemented and/or functions, such as timers, may also be located at or associated with a Physical Layer or another layer of a transmission protocol.

Moreover, those skilled in the art will appreciate that services, functions, logic components, and steps explained herein may be implemented using software functioning in conjunction with a programmed microprocessor, or using an Application Specific Integrated Circuit (ASIC), a Digital Signal Processor (DSP), or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions, components, and steps disclosed herein.

Figure 1:
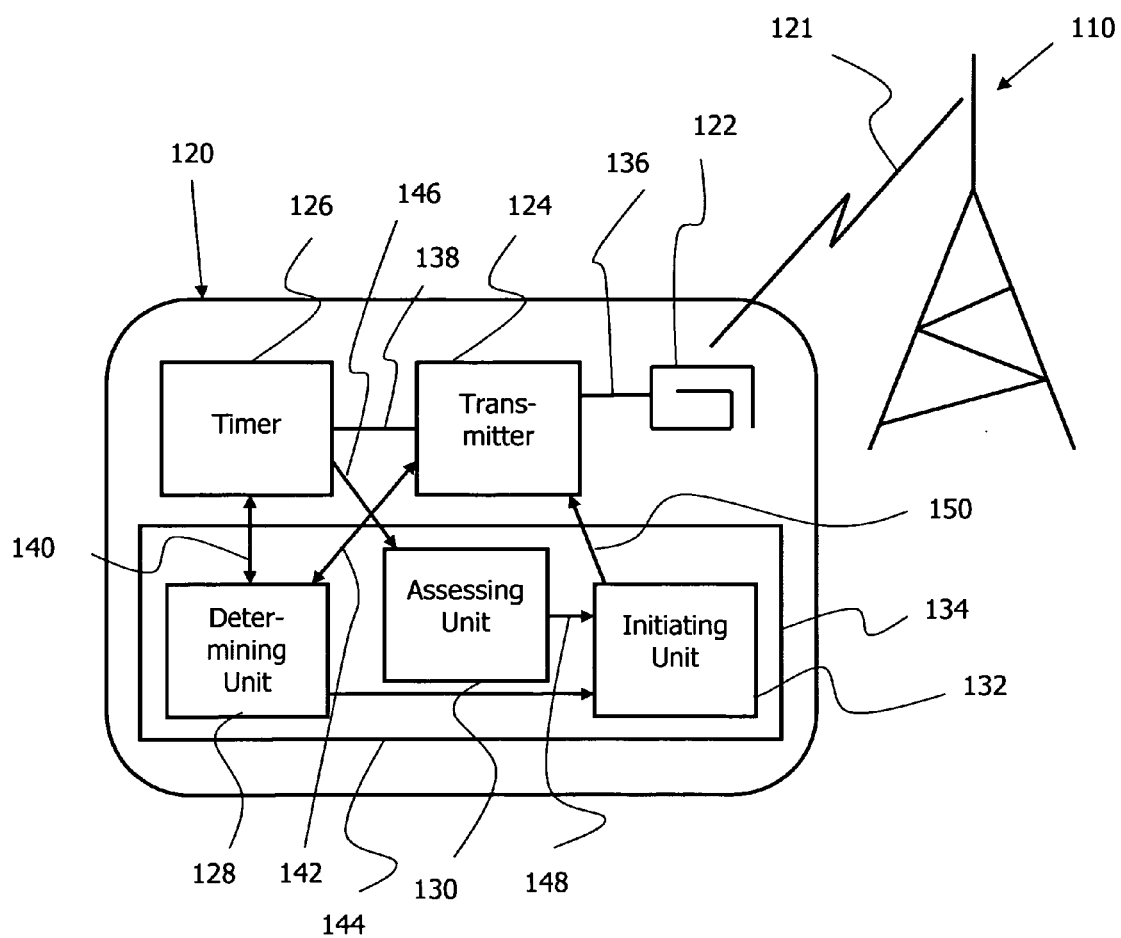

FIG. 1 schematically illustrates a portion of a wireless telecommunications network 100 including a plurality of base stations 110 and mobile devices 120. The base stations 110 tessellate the area covered by the telecommunications network into cells. The mobile device 120 within one of the cells is in a state of wireless connection 121 with the serving base station 110. The wireless connection 121 does not have to be a continuous radio connection, but may be interrupted to allow for time-division multiplexing, discontinuous reception (DRX), and/or discontinuous transmission (DTX). For example, the connected state may be characterized by one or more transmissions or receptions in a time period of 100 ms or longer.

The mobile device 120 comprises at least one antenna 122, a transmitter 124, at least one timer 126, a determining unit 128, an assessing unit 130, and an initiating unit 132. The determining unit 128, the assessing unit 130, and the initiating unit 132 may be partially or completely implemented by a single apparatus 134, e.g., using a single processor.

The transmitter 124 is connected to the antenna 122 to provide a radio frequency signal 136 to the antenna 122. The transmitter 124 may be part of a transceiver in bidirectional communication with the antenna 122. The transmitter 124 transmits the radio frequency signal 136 in response to a trigger signal 138 provided by the timer 126.

The determining unit 128 is in bidirectional communication 140 with the at least one timer 126 and in bidirectional communication 142 with the transmitter 124 to survey a queue of uplink data that is pending for transmission and to determine upcoming options for switching from an active state in a duty cycle of the transmitter 124 to an inactive state of the transmitter 124. The determining unit reports, using a connection 144, an upcoming switching option $t_{op}$ to the initiating unit 132.

The assessing unit 130 is in connection 146 with the at least one timer 126 to predict the occurrence of a future transmission triggered by the timer 126. The assessing unit 130 provides a signal 148 including a transmission time $t_{tr}$ of a future transmission, which will be triggered by the at least one timer 126, to the initiating unit 132.

Based on the signals 144 and 148, the initiating unit 132 determines whether a time difference $\Delta t$ between the switching option $t_{op}$ and the transmission time $t_{tr}$ exceeds a predefined minimum duration $T_{sleepMin}$.

Figure 2:
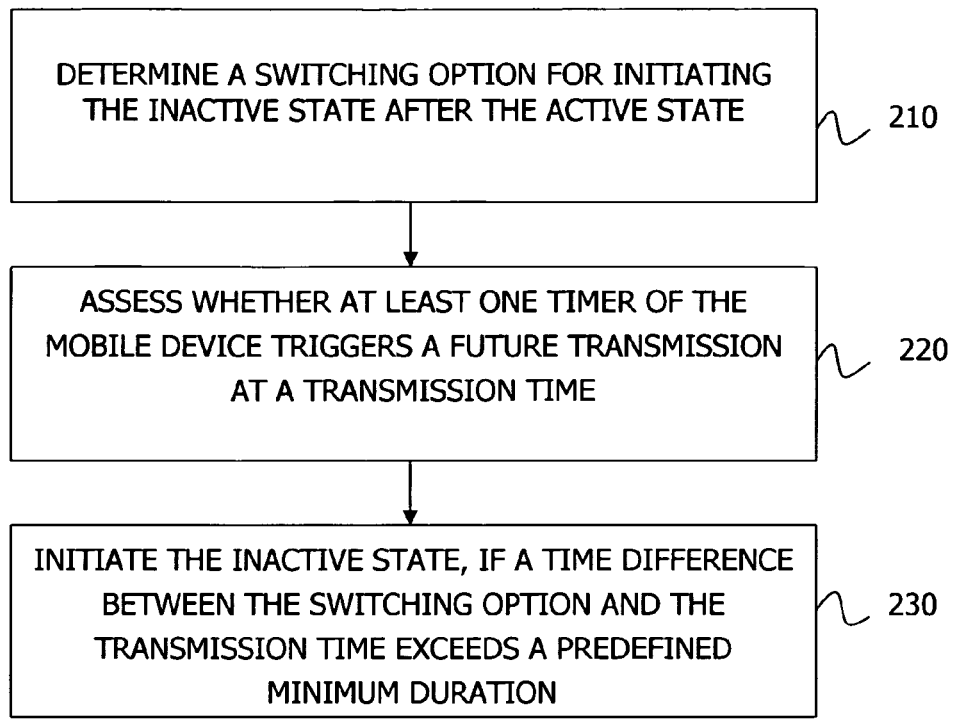
FIG. 2 shows a flow chart of a first embodiment of a method of controlling a duty cycle of a transmitter of a mobile device connected to a telecommunications network as shown in FIG. 1.

FIG. 2 shows a flow chart of a method 200 of controlling a duty cycle of a transmitter of a mobile device wirelessly connected to a telecommunications network. The method 200 may be performed by the mobile device 120.

In a step 210, the mobile device 120 is in the active state of the discontinuous reception (DRX) and determines a switching option for initiating the inactive state. The switching option is determined by the corresponding point in time, $t_{op}$, for shutting down those components of the mobile device 120 that are not essential in the inactive state. The switching option $t_{op}$ is the earliest point in time at which the standard implemented by the mobile device 120 allows for entering the inactive state, at which no uplink data is pending, and at which no transmission is ongoing.

In a step 220, it is assessed whether at least one timer 126 of the mobile device 120 will trigger a future transmission at a transmission time $t_{tr}$. In a step 230, the inactive state is initiated, only if the time difference $\Delta t = t_{tr} - t_{op}$ between the switching option $t_{op}$ and the later transmission time $t_{tr}$ exceeds a predefined minimum duration $T_{sleepMin}$. Otherwise, the active state is maintained.

The steps 210, 220, and 230 can be performed by the units 128, 130, and 132, respectively.

Figure 3:
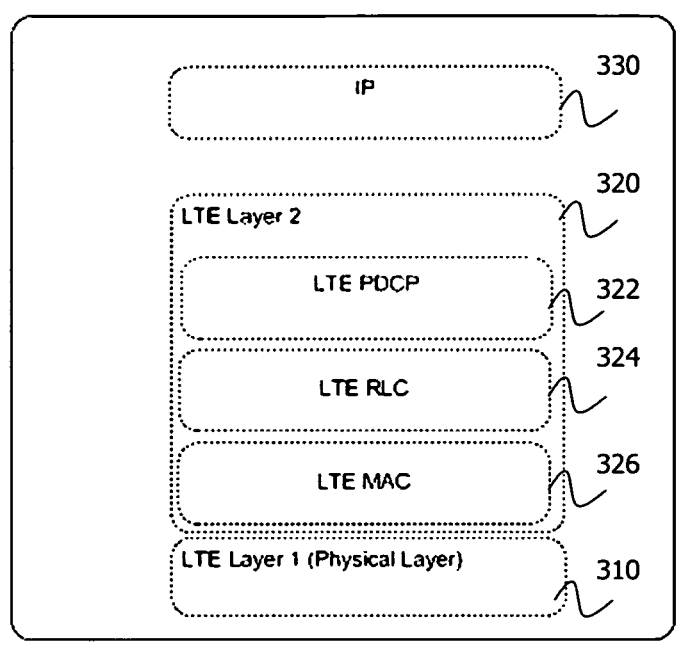
FIG. 3 schematically illustrates three layers of a protocol stack that can be implemented in the mobile device of FIG. 1.

The FIG. 3 schematically illustrates a protocol stack defined by the Long Term Evolution (LTE) standard for user data transfer. The LTE stack is implemented by the mobile device 120. The present technique can be implemented solely on the side of the mobile device 120 and does not necessarily require changes on the side of the network including the base station 110. An alternative implementation of the mobile device 120 performing the method 200 has a protocol stack according to the Universal Mobile Telecommunications System (UMTS). Protocol functionalities of both UMTS and LTE can be combined in a single mobile device 120.

The protocol stack shown in FIG. 3 comprises a network layer 330 for processing data units structured in Internet Protocol (IP) packets. A data link layer 320 processes Protocol Data Units (PDUs). The data link layer 320 includes a Packet Data Convergence Protocol (PDCP) sublayer 322, a Radio Link Control (RLC) sublayer 324, and a Medium Access Control (MAC) sublayer 326. The RLC sublayer 324 is described for the LTE implementation in the standard document 3GPP TS 36.322 (Version 10.0.0, Release 10). The MAC sublayer 326 is defined for the LTE implementation in the standard document 3GPP TS 36.321 (Version 10.5.0, Release 10).

For the UMTS implementation of a corresponding protocol stack 300, the RLC sublayer 324 is specified in the standard document 3GPP TS 25.322 (Version 10.1.0, Release 10), and the MAC sublayer 326 is defined in the standard document 3GPP TS 25.321 (Version 10.5.0, Release 10).

Figure 4:
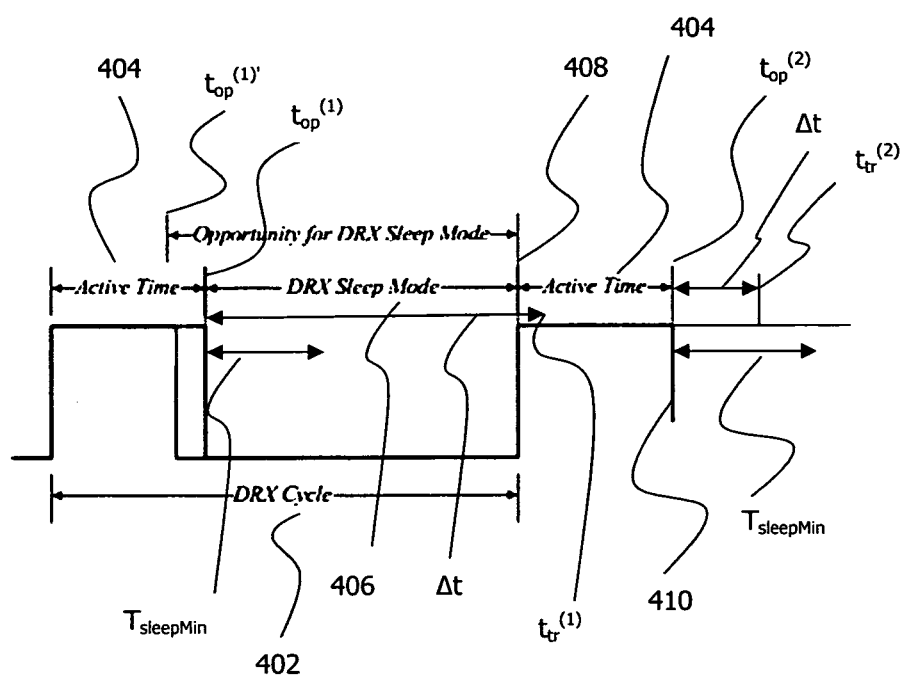
FIG. 4 schematically illustrates two subsequent duty cycles of a transmitter included in the mobile device of FIG. 1.

FIG. 4 schematically illustrates a sequence 400 of transceiver duty cycles 402 for DRX according to clause 5.7 of above-mentioned standard document 3GPP 36.321. A conventional mobile device aims at entering the inactive state, also referred to as DRX Sleep Mode, as fast and often as possible in order to minimize its power consumption. An active time 404 regularly ending at a time $t_{op}^{(1)'}$ may be extended, if data transfer is ongoing, if a scheduling request was sent on Physical Uplink Control Channel (PUCCH) and it is still pending, or if uplink data is still pending in a corresponding buffer. The resulting postponed switching option, $t_{op}^{(1)}$, is also shown in FIG. 4. The switching between the DRX modes requires some time for a controlled disabling and enabling of hardware units and system clocks in the mobile device 120. The method 200 performed by the mobile device 120 avoids that the switching time delays a transmission of uplink data triggered by one of the timers 126.

In the first DRX cycle shown in FIG. 4, a future transmission can be foreseen to occur at the transmission time $t_{tr}^{(1)}$ based on the timer 126, which is assessed by the assessing unit 130 in the step 220. The initiating unit 132 determines the time difference Δt and finds, in the case of the first DRX cycle, that the remaining time exceeds the minimal sleeping time $T_{sleepMin}$. The time threshold $T_{sleepMin}$ is usually in the range of several milliseconds. The minimal sleeping time $T_{sleepMin}$ depends on the hardware components of the mobile device 120. In an exemplary implementation, $T_{sleepMin}$ is chosen to equal the switching time (e.g., for switching from the active state to the inactive state and back to the active state) multiplied by a factor of 1.2 to 2.0.

Since the time difference exceeds the minimal sleeping time $T_{sleepMin}$ in the first DRX cycle 402, the initiating unit 132 initiates, at the switching option $t_{op}^{(1)}$ and via a connection 150 to the transmitter 124, the shutdown of the transmitter 124 and of the system clocks exclusively driving the transmitter 124. The initiating unit 132 also reactivates the transmitter 124 at a time 408 and the transmitter 124 performs the corresponding transmission at the scheduled transmission time $t_{tr}^{(1)}$.

In the second DRX cycle shown in FIG. 4, the timer 126 expires at a transmission time $t_{tr}^{(2)}$, which does not exceed the required minimal sleeping time $T_{sleepMin}$. Consequently, the initiating unit 132 does not initiate the DRX sleep mode but maintains the active state of the transmitter 124. The transmitter 124 then performs the scheduled transmission at the transmission time $t_{tr}^{(2)}$ without radio interruption since the last transmission at the transmission time $t_{tr}^{(1)}$ (which in this case occured within the mandatory active time 404 of the second DRX cycle).

More detailed embodiments compatible with the method embodiment 200 and the mobile device 120 are described with reference to the FIGS. 5 to 7, wherein the timer 126 is associated with the RLC sublayer 324. There are two exemplary cases of uplink data generation within the LTE RLC sublayer, when the mobile device 120 is in an RLC Acknowledged Mode.

A first case is a retransmission of an LTE RLC Acknowledged Mode Data (AMD) PDU. The expiry of a timer triggers the retransmission of an LTE RLC AMD PDU including a status poll bit (according to above-mentioned standard 3GPP TS 36.322, clause 5.2.2.3). The corresponding timer is denoted "t-PollRetransmit". This allows the mobile device 120 functioning as a sending entity to gain information as to the successful reception of a transmitted PDU, and to ensure that the PDU was actually received.

A second case is a transmission of an LTE RLC status PDU due to an expiry of a reordering timer and/or a status prohibiting timer. The reordering timer is denoted "t-reordering" and defined in aforementioned standard document 3GPP TS 36.322 in clause 5.1.3.2. The status prohibiting timer is denoted "t-StatusProhibit" and defined in the aforementioned standard in clause 5.2.3.

Figure 5:
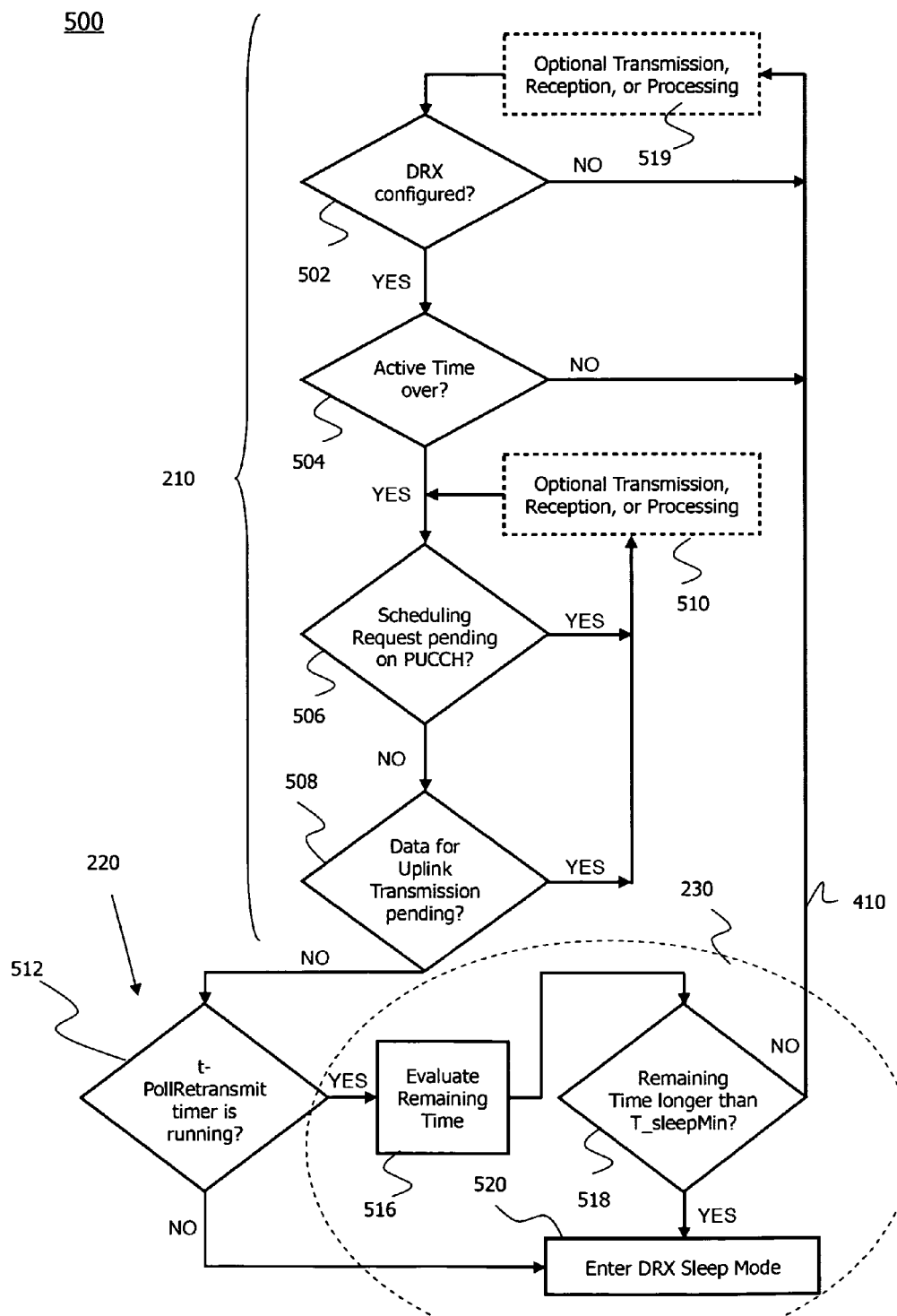
FIG. 5 shows a flow chart of a second embodiment of a method of controlling a duty cycle of a transmitter of a mobile device.

FIG. 5 shows a flow chart 500 of a second method embodiment using the t-PollRetransmit timer as one of the one or more timers 126. The LTE standard defines certain criteria for setting a poll bit in a header of a transmitted LTE RLC AMD PDU. The set poll bit indicates to the receiving RLC peer entity (e.g., the RLC sublayer 324 of a mobile device receiving the PDU) that a transmission of an LTE RLC Status PDU is requested for the PDU including the set poll bit. The status includes an acknowledge signal or a negative-acknowledge signal as to the success and failure, respectively, of the reception of the corresponding PDU. At the transmitting RLC entity (e.g., the RLC layer 324 of the mobile device 120), the reception of the requested LTE RLC Status PDU is supervised by starting the t-PollRetransmit timer. The timer is reset as soon as the requested status is received. If, however, the timer expires, no LTE RLC Status PDU has been received. Consequently, a further poll bit will be added to an LTE RLC PDU in a next transmission. In case no new user data transmission is pending, the LTE RLC sublayer 324 retransmits the last transmitted LTE RLC PDU. Therefore, the transmission time, $t_{tr}$, is predictable based on the t-PollRetransmit timer, e.g., in case of pending user data due to the transmission of said user data and in case of no pending user data due to the retransmission of the previously submitted PDU.

The method 500 verifies in a step 502 that DRX is configured, and in a step 504 that the Active Time 404, as defined in clause 3.1 of the standard 3GPP 36.321, has ended. It is verified in a step 506 that no scheduling request sent on PUCCH is pending, and in a step 508 that also no data for uplink transmission is pending, e.g., when an uplink grant for a pending HARQ retransmission is awaited for data in the corresponding HARQ buffer. Otherwise, the corresponding transmission 510 is performed. Thus, the steps 502 to 508 are examples of the step 210 of determining the switching option.

In a decision step 512, the assessing unit 130 checks whether the t-PollRetransmit timer is running. The step 512 thus is an example of the step 220 of assessing whether the at least one timer 126 will trigger a transmission. The corresponding transmission time $t_{tr}$ is evaluated in a step 516. In case a step 518 determines that the remaining time Δt is less than $T_{sleepMin}$, the initiating unit 132 extends the active state, as discussed for the step 410, and performs the corresponding transmission 519 at the transmission time $t_{tr}$. Otherwise, the initiating unit 132 decides in the step 518 to inactivate the transmitter 124 according to a step 520.

Figure 6:
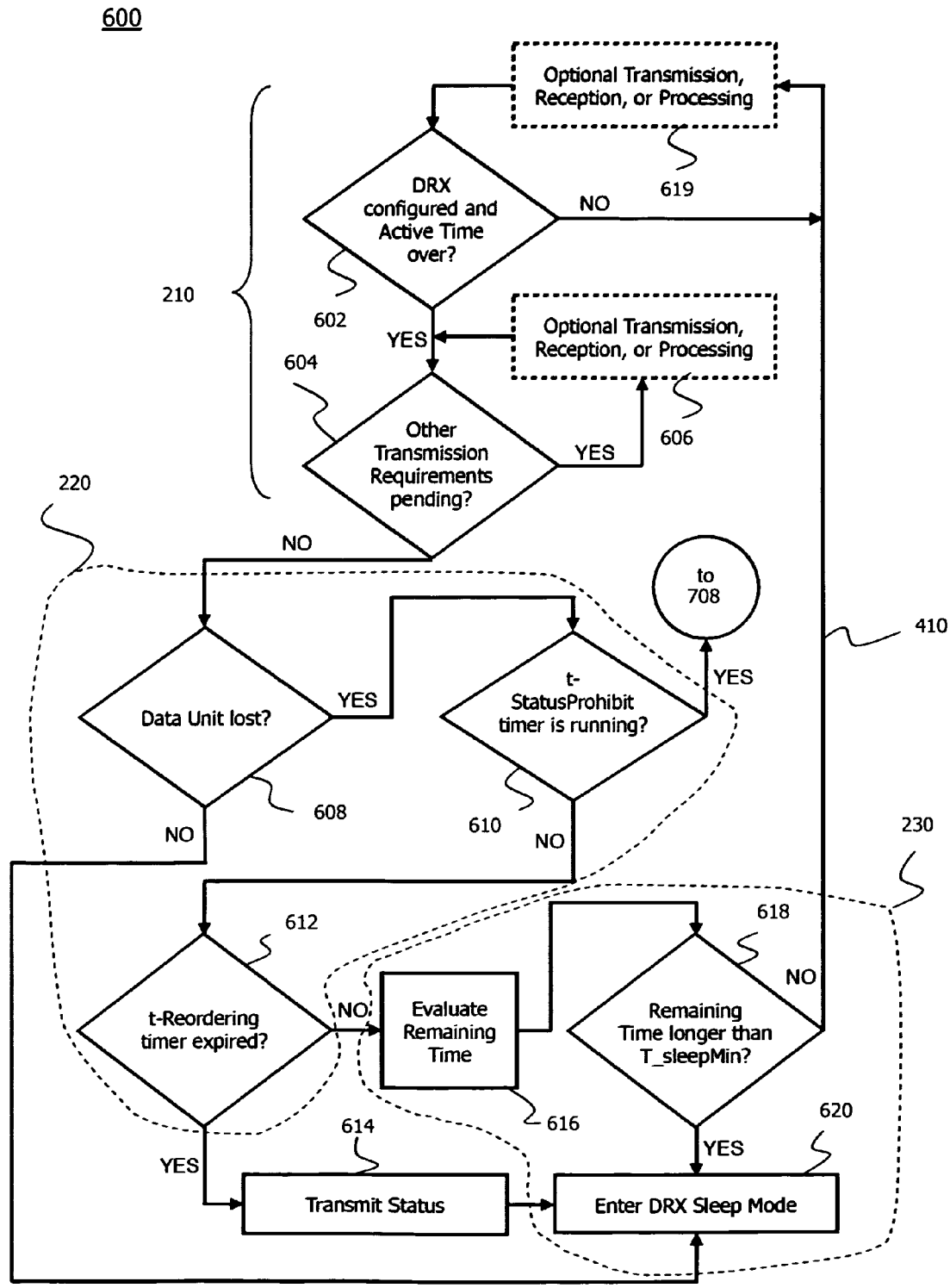
FIG. 6 shows a flow chart of a third embodiment of a method of controlling a duty cycle of a transmitter of a mobile device.
Figure 7:
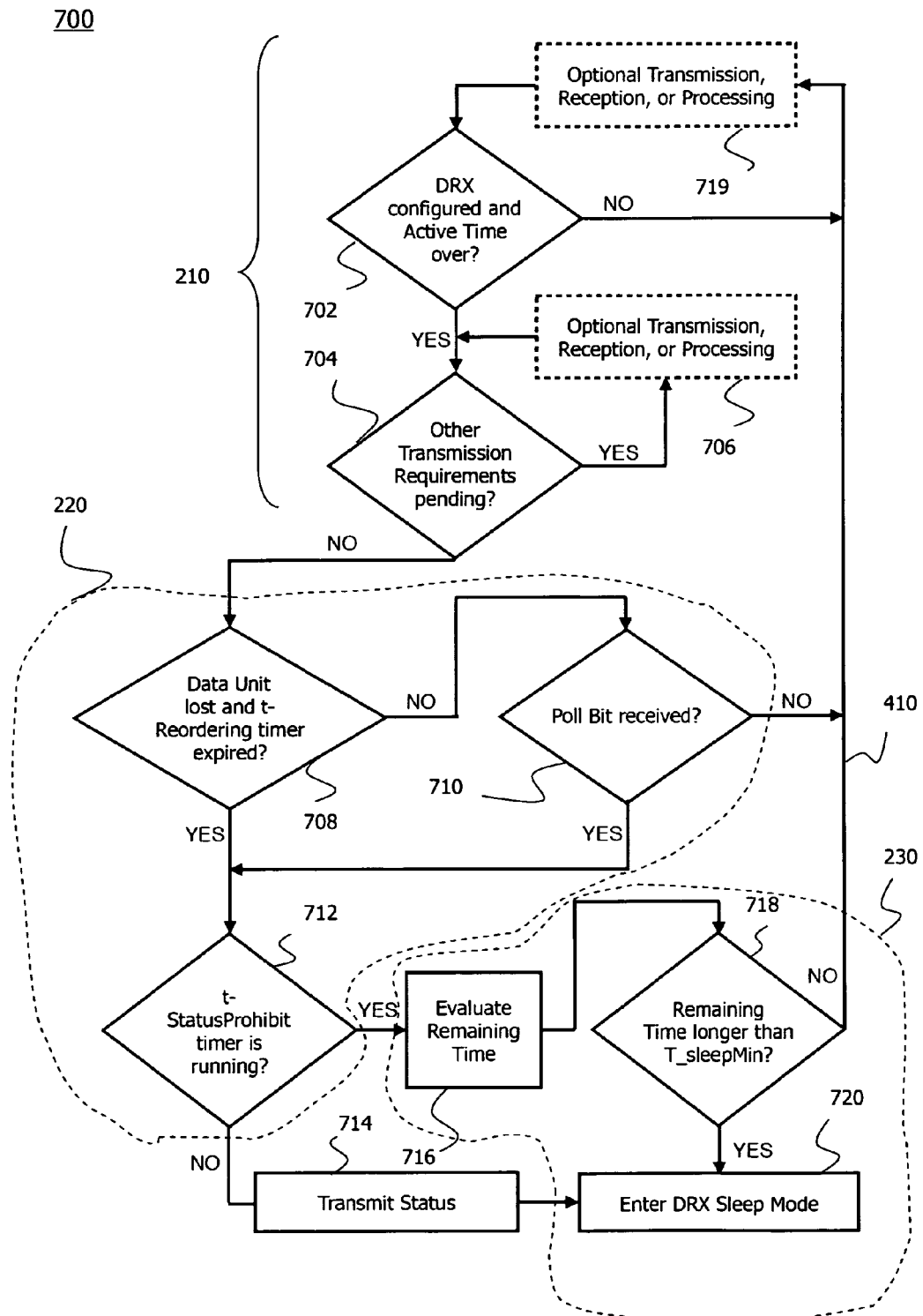
FIG. 7 shows a flow chart of a fourth embodiment of a method of controlling a duty cycle of a transmitter of a mobile device.

FIG. 6 shows a flow chart 600 of a third method embodiment relating to the second case of transmitting the RLC Status PDU, wherein the at least one timer 126 includes the t-ReorderingTimer.

The method 600 verifies that DRX is configured and that the Active Time 404 of the DRX cycle 402 is over (similar to the steps 502 and 504). In a subsequent step 604, it is verified that no other pending transmission requirements necessitate an extension of the active state (e.g., based on the steps 506 and 508). Otherwise, a corresponding transmission 606 is performed. The steps 602 and 604 thus determine a switching option $t_{tr}$ according to the step 210.

During the LTE RLC AMD communication of user data, the LTE RLC Status PDU is generated and transmitted (by the receiving entity of the communication), if one of the criteria defined in the standard document 3GPP TS 36.322, clause 5.2.3, is fulfilled. For example, the status transmission is triggered by the receiving LTE RLC entity upon detection of a lost LTE RLC AMD PDU in a step 608. The method 600 verifies in a step 610 that the t-StatusProhibit timer is not running. In this situation, the t-ReorderingTimer, which is running due to the detection of the lost LTE RLC AMD PDU, will trigger upon expiry the transmission of the RLC Status PDU. In a decision step 612, the method branches off to immediately transmit the status in a step 614, if the t-ReorderingTimer has already expired. Otherwise, the remaining time until expiry of the t-ReorderingTimer is evaluated in a step 616, and the remaining time is compared to the minimal sleep time $T_{sleepMin}$ in a step 618. The DRX active mode is maintained for performing the corresponding transmission in a step 619, if the remaining time is less than $T_{sleepMin}$. The DRX sleep mode is initiated in a step 620, if the remaining time exceeds $T_{sleepMin}$. The steps 616, 618, 619 and 620 are thus similar to the steps 516, 518, 519 and 520, respectively, and exemplify the step 230 in more detail.

The analysis of the t-StatusProhibit timer in the step 610 and the t-ReorderingTimer in step 612 are an example of logically combining a plurality of timers 126 in the step 220 of assessing whether such timers 126 trigger a future transmission. The steps 616 to 620 are an example of the step 230 of the general method embodiment 200.

A second criterium causing the transmission of an RLC Status PDU (according to the standard document 3GPP TS 36.322, clause 5.2.3) is the reception of an RLC PDU in which the poll bit is set. In order to limit status traffic, each transmission of an RLC Status PDU starts a timer t-Status-Prohibit, which prevents the transmission of a further RLC Status PDU as long as the t-StatusProhibit timer is running. FIG. 7 shows a flow chart 700 of a fourth method embodiment including the t-StatusProhibit timer as an example of the timer 126. According to the step 210 discussed above, the method 700 verifies that DRX is configured and the active time is over in a step 702, and that no further transmission requirements are pending in a step 704 (similar to the steps 602 and 604). Otherwise, the active state is extended for the corresponding transmission in a step 706.

Based on the switching option $t_{tr}$ determined in the step 210, the method 700 determines in a step 708 whether a data unit has been lost (at the receiving RLC entity) and the reordering timer has expired, or in a step 710 whether an LTE RLC AMD PDU including the poll bit has been received. If one of the criteria according to the step 708 or 710 for transmitting the RLC Status PDU are fulfilled, the method 700 assesses in a step 712 whether the t-StatusProhibit timer is running. If the t-StatusProhibit timer is running, its expiry defines the transmission time $t_{tr}$, as a result of the step 220 including the steps 708 to 712. If the t-StatusProhibit timer is not running, the RLC Status PDU is transmitted immediately in a step 714 (similar to the step 614).

According to the step 230, the time remaining until the future transmission is due at the transmission time $t_{tr}$ is evaluated in a step 716, based on which a step 718 compares the remaining time with the minimal sleeping time $T_{sleepMin}$ and initiates the DRX sleep mode according to a step 720, if the remaining time exceeds $T_{sleepMin}$. Otherwise, the active time is extended according to the step 410 discussed in the context of the second duty cycles 402 shown in FIG. 4 for performing the outstanding transmission in a step 719.

As has become apparent based on above exemplary embodiments, at least some of the embodiments prevent a delayed transmission due to a switching time required for switching between active and inactive DRX modes by taking transmission events predetermined by local timers in the mobile device into account. A delayed transmission of uplink data due to the time required for bringing clocks, receivers, etc. back into operational mode can be avoided.

Particularly, some embodiments prevent a delayed transmission of an LTE RLC Status PDU or of an LTE RLC AMD PDU with enabled poll bit. By taking into account timers for both a future retransmission including the poll bit and a future status transmission, transmission responsiveness is even further increased, because the PDU including the poll bit triggers the sending of the status PDU by the receiving RLC peer entity. In other words, the correlation between poll bit transmission and status transmission leads to quadratic gain in transmission responsiveness.

While the conventional techniques for controlling a duty cycle of a transmitter in a mobile device suffer from a negatively affected completion of user data transmission due to a delayed RLC AMD Status PDU requesting RLC retransmission, if user data (e.g., an LTE RLC AMD PDU) is lost in the wireless transmission just before a possible DRX sleep mode, at least some of the embodiments can prevent a delay of user data transmission.

As will be recognized by those skilled in the art, the features described above can be modified and varied over a wide range of applications. Accordingly, the scope of patented subject-matter should not be limited to any of the specific exemplary teachings discussed above, but is defined by the following claims.

The invention claimed is:

1. A method of controlling a duty cycle of a transmitter of a mobile device wirelessly connected to a telecommunications network, the duty cycle including an active state and an inactive state, the method comprising:
   determining a switching option for initiating the inactive state after the active state;
   assessing whether at least one timer of the mobile device triggers a future transmission at a transmission time; and
   initiating the inactive state in response to determining that a time difference between the switching option and the transmission time exceeds a predefined minimum duration.

2. The method of claim 1, further comprising:
   returning to the active state on or before the transmission time.

3. The method of claim 1, further comprising:
   extending the active state in response to determining that the time difference between the switching option and the transmission time does not exceed the predefined minimum duration.

4. The method of claim 1, wherein the predefined minimum duration is determined by one or more processes involved in at least one of initiating the inactive state and returning to the active state.

5. The method of claim 1, wherein the predefined minimum duration is tabulated in the mobile device.

6. The method of claim 1, further comprising:
determining whether uplink data is pending for transmission, wherein initiating the inactive state is further subject to the condition that no uplink data is pending.

7. The method of claim 1, wherein the future transmission transmits control data or retransmits user data.

8. The method of claim 1, wherein the at least one timer is started in response to detecting a loss of a data unit, and the transmission time is indicated by an expiry of the at least one timer.

9. The method of claim 1, wherein the at least one timer excludes an outstanding transmission, and the transmission time is indicated by an expiry of the at least one timer.

10. The method of claim 1, wherein the at least one timer includes a timer of a Radio Link Control sublayer of the mobile device.

11. A non-transitory computer readable medium storing a computer program comprising program code to perform a method of controlling a duty cycle of a transmitter of a mobile device wirelessly connected to a telecommunications network, the duty cycle including an active state and an inactive state, the method comprising:
determining a switching option for initiating the inactive state after the active state;
assessing whether at least one timer of the mobile device triggers a future transmission at a transmission time; and
initiating the inactive state in response to determining that a time difference between the switching option and the transmission time exceeds a predefined minimum duration.

12. An apparatus for controlling a duty cycle of a transmitter of a mobile device configured to be wirelessly connected to a telecommunications network, the duty cycle including an active state and an inactive state, the apparatus comprising:
a determining unit configured to determine a switching option for initiating the inactive state after the active state;
an assessing unit configured to assess whether at least one timer of the mobile device triggers a future transmission at a transmission time; and
an initiating unit configured to initiate the inactive state in response to determining that a time difference between the switching option and the transmission time exceeds a predefined minimum duration.

13. The apparatus of claim 12, wherein the initiating unit is further configured to return to the active state on or before the transmission time.

14. The apparatus of claim 12, wherein the initiating unit is further configured to extend the active state, if the time difference between the switching option and the transmission time does not exceed the predefined minimum duration.

* * * * *